Cone and Hoynes,
Mower.
4117X
Patented May 18. 1825
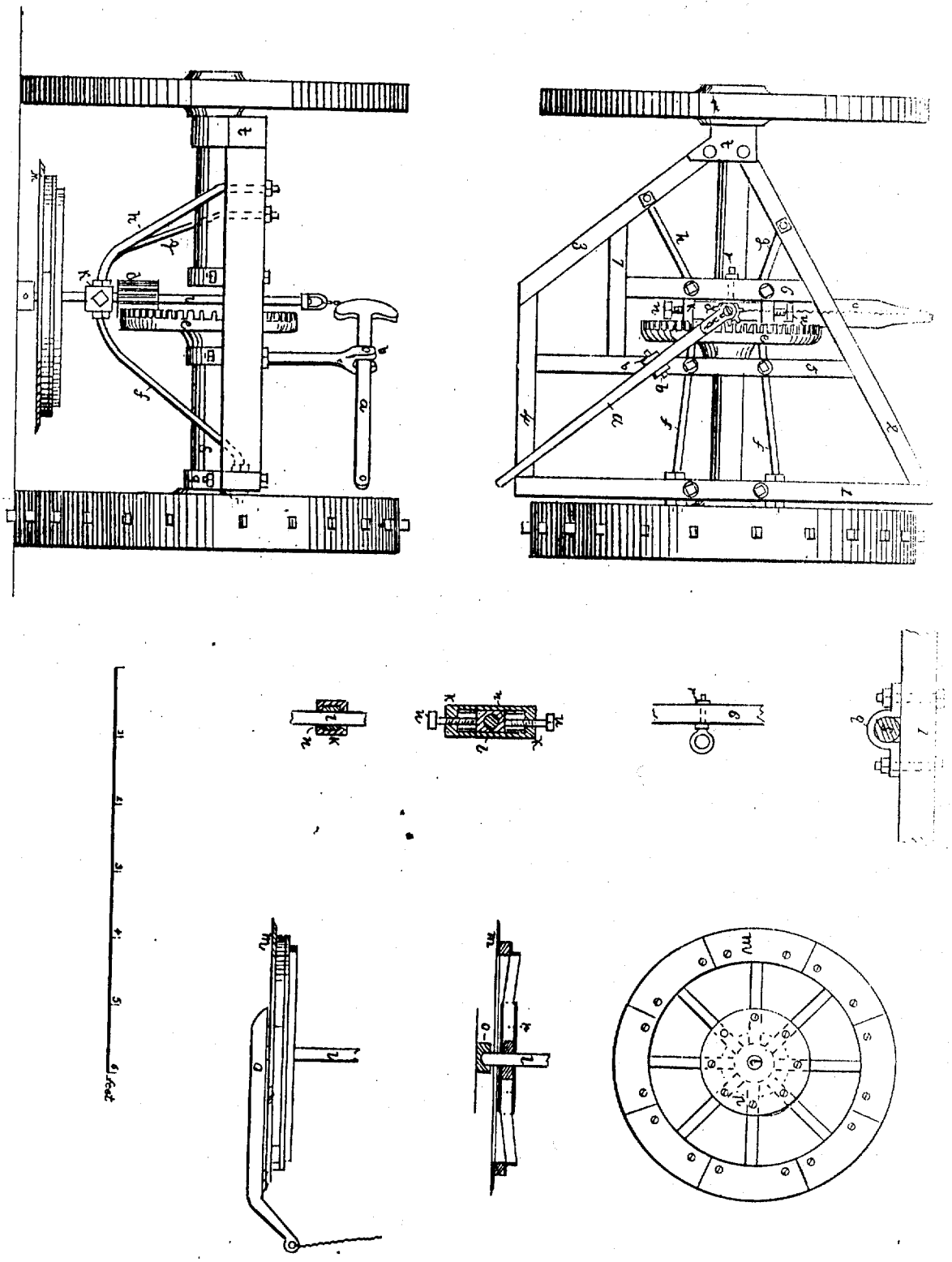

4117X

UNITED STATES PATENT OFFICE.

EZRA COPE AND THOMAS HOOPES, JR., OF CHESTER COUNTY, PA.

MOWING-MACHINE.

Specification forming part of Letters Patent dated May 18, 1825.

*To all whom it may concern:*

Be it known that we, EZRA COPE and THOMAS HOOPES, Jr., of Chester county, Pennsylvania, have invented an Improvement in Mowing Machines, of which the following is a specification.

The mowing-machine as improved is constructed in the following manner: Two wheels five feet six inches in diameter are constructed in the usual manner with hubs, spokes, fellies, and tire like the wheels of a common cart, except that the rim and tire of the off wheel is of the usual width of rim and tire, while the rear wheel has a rim and tire of twice the width, and that the tire of this latter wheel is provided with small teeth or cogs to prevent its slipping on the ground. The wheels run on different axles, but both axles are on the same straight line. A frame-work to connect these wheels together and to support the whole machinery is constructed in the following manner: A piece of plank three by seven inches and six feet long, which by way of distinction may be called "No. 1," is laid on its center on the axle of the near wheel, close to the hub, at a right angle with it. This axle, immediately under this piece, is grooved, and an iron collar surrounding the groove is secured or bolted to the plank No. 1 on each side of the groove, so that this axle, which is permanent in the hub, can revolve in the groove. No. 2 is another piece of plank of equal dimensions. It extends diagonally from the rear end of No. 1, to which it is mortised, to the axle of the off wheel, close to the hub, where it is mortised to No. 3. No. 3 is a plank of equal dimensions, one end of which is mortised to No. 2, as aforesaid. This piece forms with No. 2 an angle of eighty degrees. The other end extends diagonally toward the front of the rear side of the carriage. On a line with the front of the wheels is a piece of plank of the same width and thickness, No. 4. One end of this is mortised to the front end of No. 1 at a right angle with it, and the other is mortised to No. 3 where it intersects it. From the piece No. 2, at the distance of one foot nine inches from No. 1, is another piece of plank of equal width and thickness, extending from No. 2 to No. 4, and mortised into each of them. This piece, No. 5, supports the center of the axle of the near wheel by means of a groove in the axle and a collar fastened to No. 5, as before described as respected No. 1. At the distance of two feet three inches from the hub of the off wheel is another piece of plank of equal width and thickness, No. 6. This piece is exactly parallel to No. 5, with one end mortised to No. 2 and the other to a cross-piece, No. 7, which connects Nos. 3 and 5. To the under part of this piece No. 6 is fastened the center end of the stationary axle of the off-wheel. This axle is also fastened near the hub to No. 2. In the interstice between the planks Nos. 5 and 6 and Nos. 2 and 7 is a vertical iron shaft with a pinion on it, and also a vertical cog-wheel. This vertical shaft is placed immediately in the center of the whole machinery between the center ends of the two axles. The pinion is under the frame-work, and is seven inches long, and has nine leaves. The shaft is four feet long. The lower part of it is encompassed by an iron collar, which is fastened by two screw-bolts that may be moved backward or forward for the purpose of regulating the edge (when required) in a horizontal groove in the bottom of an iron frame, which is supported by four iron stanchions, two connected with the plank No. 1 on each side of the axle, one with No. 2, and one with No. 3. The ends of the stanchions which are connected with the plank No. 1 are bent to a horizontal knee, so as to pass horizontally through the plank, and having a screw-thread worked upon each, and being provided with a nut on each side of the planks. No. 1 regulates the connection between the pinion and cog-wheel with the utmost nicety. The vertical shaft is confined to the plank No. 6 by a collar, which, after surrounding the shaft, terminates in a screw which passes through the plank No. 6, and is confined by a nut on either side which allows it to turn around, and by which the upper end of the end shaft is regulated. The lower part of the vertical shaft, after passing through the movable collar first described, passes through and is fixed in the hub of the horizontal wheel hereinafter described. At the head of the vertical shaft is a swivel, which, by means of a small chain passing over a cam, fixed at the end of lever of the first order, the fulcrum of which is fixed in an upright piece mortised in the upper side of plank No. 5. The long end of this lever passes diagonally toward the front of the near side of the carriage by depressing it. The vertical shaft, horizontal wheel, and runner may be raised, the shaft slipping through the collars, and the pinion passing out of the reach of the cog-wheel, which throws the machinery out of gear. To the center end of the movable axle of the near wheel, on the off side of the collar, which confines this end of the axle with the plank No. 5, is affixed the vertical cog-wheel aforementioned. It is two feet six inches in diameter, and has sixty cogs. The hub of the horizontal wheel is formed by riveting together two plates of iron with blocks between, forming what by millwrights is commonly called a "block-wheel." In the interstices are wooden arms or spokes, which are dished out or inclined upward, at the end of which is an iron knee, bent first vertically and then horizontally, to which is fastened an outer circular frame of wood, on which the scythes are screwed. The inner part of this wheel is surmounted with a circular box inverted. The scythes are sections of a circle screwed to the periphery of the horizontal wheel, so as to form a continued circle of scythes, the edge outward. Under the horizontal wheel is a runner, in one end of which the vertical shaft revolves. The other passes to the rear of the horizontal wheel, where it has a chain or cord attached to it, which chain or cord, after passing over a pulley fixed in a frame at the rear of the carriage, is fastened to the end of the lever before described. The shafts are affixed to the carriage in the following manner: Immediately over the axle of the near wheel is a cross-piece extending from the plank No. 1 to No. 5. To this piece is fastened the rear end of the off shaft. A bolt also passes through this shaft and plank No. 4, and another through this shaft and the front end of No. 3. The near shaft at its rear end is fixed to a perpendicular bar terminating in a collar at the lower end, through which the axle passes and revolves outside of the hub. A cross-piece extending from one shaft to the other is fastened by a screw-bolt to the front end of No. 1. On the near shaft is a hook, to which the end of the lever may be hitched when depressed, as before mentioned.

The improvements are as follows: One of the wheels of Bailey's carriage is placed farther back than the other. The present one has the wheels on a line with each other. The machinery of Bailey's machine is complicated. The present is simple. Bailey's has a cog-wheel screwed on the outside of the fellies of his near wheel, which turns a horizontal shaft, upon which is fixed a vertical face-wheel, whose cogs turn a trunnel-head or a vertical shaft, which turns the horizontal wheel and scythes. In the present machine the vertical cog-wheel, being fixed to the permanent axle of the near wheel, turns with it and communicates motion directly to the shaft of the horizontal wheel by means of the pinion. This is a great improvement. To the bottom of the shaft of Bailey's machine, near the ground, is fixed a circular horizontal frame-work, consisting of a wooden hub fixed to the shaft, with iron arms running out straight a certain distance, and then bent, first vertically, then horizontally, upon which sectional pieces of sheet-iron are fixed. The hub of the present wheel is formed by riveting together two plates of iron one foot in diameter, with blocks between. The arms or spokes are of wood, and the circular frame to which the scythes are screwed is of wood, which is another improvement. The weight is much diminished, and the scythes are put on and taken off with more ease. The runner of Bailey's machine is secured to the tail of the carriage, the consequence of which is that the resistance with which the scythes are met presses against the tail of the carriage, which has a tendency to raise that up and press down the fore part upon the backs of the horses. In the present machine the runner has a chain or cord attached to its rear end, which passes over a pulley and is fastened to the end of the lever. Not being fastened to the end of the carriage, the runner to the present machine cannot have the evil tendency above described. This is an improvement. In Bailey's machine the works are thrown out of gear by removing the horizontal shaft and vertical wheel in front. In the present machine the works are thrown out of gear in a more expeditious and improved manner by simply pressing the long end of the lever, which raises the vertical shaft and its pinion thereon affixed out of reach of the cogs of the cog-wheel. Bailey's machine labors under a disadvantage in this, that the horizontal wheel and scythes attached have no proper method of being raised or depressed at the front edge, as occasion may require, by using a taller or shorter horse in the shafts. In the present improved machine that difficulty is completely obviated. The collar which encompasses the lower part of the shaft is fastened by two screw-bolts, and moves backward and forward, as occasion may require, in a horizontal groove in the bottom of an iron frame, which is supported by the four stanchions before particularly described. By unscrewing the nuts and shoving the collar in the horizontal groove in the direction required the horizontal wheel and scythes attached may be raised or lowered at the front edge to suit the stature of any animal used in the shafts. Bailey's machine labors under another disadvantage in not being provided with means sufficient for regulating the gearing of the scythe-wheel as occasion may require. This machine has that improved method. The projections, which are connected with the plank No. 1 are bent so as to pass horizontally through that plank, and having a screw-thread worked upon each, and having each a nut on either side of the plank No. 1, they may be drawn up or pushed out at pleasure, and just so much as is required, thereby regulating the connection between of the vertical shaft and the vertical cog-wheel with the utmost nicety. The present machine possesses another great advantage over Bailey's in this, that the machinery all works from one common center, whereas Bailey's machinery works from different centers.

EZRA COPE.
THOMAS HOOPES, JR.

Witnesses:
E. BRADY,
JAMES DAVIS,
ABISHAR CLARK.